(12) United States Patent
Ehrlich et al.

(10) Patent No.: US 7,721,615 B2
(45) Date of Patent: May 25, 2010

(54) MOTOR VEHICLE TRANSMISSION ACTUATOR FOR OPERATING A MOTOR VEHICLE TRANSMISSION

(75) Inventors: Matthias Ehrlich, Buehl (DE); Norbert Esly, Buehl (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 480 days.

(21) Appl. No.: 11/795,738

(22) PCT Filed: Dec. 24, 2005

(86) PCT No.: PCT/DE2005/002325

§ 371 (c)(1),
(2), (4) Date: Jul. 20, 2007

(87) PCT Pub. No.: WO2006/076877

PCT Pub. Date: Jul. 27, 2006

(65) Prior Publication Data
US 2008/0132371 A1    Jun. 5, 2008

(30) Foreign Application Priority Data
Jan. 20, 2005    (DE) .................. 10 2005 002 589

(51) Int. Cl.
*F16H 59/02*    (2006.01)

(52) U.S. Cl. ..................................... 74/335; 74/473.12

(58) Field of Classification Search .................. 74/335, 74/473.1, 473.12, 473.33, 471 XY
See application file for complete search history.

(56) References Cited

U.S. PATENT DOCUMENTS

| 4,784,007 | A | * | 11/1988 | Ishida et al. | 74/335 |
| 4,821,590 | A | * | 4/1989 | Tury et al. | 74/335 |
| 4,911,031 | A | * | 3/1990 | Yoshimura et al. | 74/335 |
| 7,026,770 | B2 | | 4/2006 | Hemphill et al. | |
| 7,549,351 | B2 | * | 6/2009 | Amamiya et al. | 74/335 |

FOREIGN PATENT DOCUMENTS

| DE | 19727946 | 1/1999 |
| DE | 103 54 721 A1 | 11/2004 |
| DE | 10359206 A1 | 12/2004 |
| EP | 1 508 727 A2 | 2/2005 |
| GB | 2 394 261 A | 4/2004 |

* cited by examiner

*Primary Examiner*—Ha D. Ho
(74) *Attorney, Agent, or Firm*—Davidson, Davidson & Kappel, LLC (57) ABSTRACT

A motor vehicle transmission actuator for operation of a motor vehicle transmission, including gearsets which form different ratios, whereby the transmission actuator has a threaded shaft with at least one first threaded section, embodied as a right-handed thread and at least one second threaded section, embodied as a left-hand thread with just one electric motor for driving in the selection direction and the switching direction.

33 Claims, 5 Drawing Sheets

MOTOR VEHICLE TRANSMISSION ACTUATOR FOR OPERATING A MOTOR VEHICLE TRANSMISSION

The invention relates to a motor vehicle transmission device, a motor vehicle transmission actuator for operating a motor vehicle transmission, an operating device for a motor vehicle transmission having a motor vehicle transmission actuator, and a motor vehicle power train having such an operating device.

BACKGROUND

Motor vehicle transmission devices are known in various forms. Starting from conventional manual transmissions, automated manual transmissions (AMTs) for example were created, in which shifting processes are controlled (actuated) electronically. Furthermore, transmissions have become known which have parallel-shifted power train branches, for example double clutch transmissions (DCTs) or parallel shift transmissions (PSTs).

With motor vehicle transmission devices, a distinction is often made between the internal gearbox with its internal gear shifting system and an external gear shifting system, which is also often referred to as a transmission actuator—in particular in the case of designs supported by external force or designs with an electric motor.

The internal gearbox with its internal gear shifting system usually has the components that form the different transmission ratios, such as gear wheels, as well as components that are or can be coupled with these components, such as shafts. As a rule, gear clutches or devices of equivalent or similar function are provided here, by means of which linkages can be produced to engage gears and released to disengage gears. An example of this can be that by means of such a gear clutch a rotationally fixed connection can be created or released between a gear wheel of a gear set that produces one gear ratio and a shaft that carries that gear wheel. The internal gear shifting system extends from these gear clutches to the interface to the external gear shifting system. In most cases the latter has a plurality of mechanisms, which extend from a gear clutch in the direction of the external gear shifting system. A variety of designs are known in which in order to transmit power from the external gear shifting system to the internal gear shifting system these aforementioned mechanisms each have a shift gap or the like, which is inserted for example into a shift rail or shift fork or the like. The external gear system here frequently has one or more parts such as selector fingers, which these shift gaps can engage and activate. This is frequently realized in that to make a selection such a selector finger or the like can be moved into a position, out of which it can then be moved in an additional motion whose direction generally differs from the direction of the selecting motion, to perform the shift.

It is also known that in gear shifting processes in classically designed stepped transmission devices—starting from the former gear—the following three steps take place in time sequence: "Disengaging the former gear"- "selecting"- "engaging the destination gear." In addition, motor vehicle transmission designs have become known in which the selecting or selection motions can take place before the former gear is disengaged. Such designs include the provision for example that a main operating element or selecting finger is essentially responsible only for engaging gears, and that additional geometries assume the function of disengaging gears. Here in particular so-called auxiliary operating elements are used for the disengaging function. It is also known that the additional geometries are located for example on the one hand on a central shifting shaft, and on the other hand on shift gaps which are provided on the forenamed mechanisms or final output mechanisms or shift forks or shift rails or the like.

As a rule the disengaging geometries work in tracks in which the selecting finger or some main operating element is not active. Provision may be made so that a firm assignment between selecting finger or main operating element and disengaging geometry simultaneously represents an active gear block. Design implementations of this approach are therefore also known as "active interlock."

Such an "active interlock" generally provides that the main operating element or selecting finger can be moved back into the middle or neutral position even with a gear engaged, without disengaging the gear. The selecting movement becomes possible here before the gear is disengaged.

Examples of such designs are explained for instance in the Applicant's DE 102 06 561 A1.

Where gear changing processes in the designs of the forenamed type are controlled electronically by means of an electric motor, these designs always have two separate electric motors. The first of these electric motors, known as the selector motor, serves to select gears, and the second electric motor, known as the shift motor, serves to shift or engage gears.

In addition, however, a design has become known in which the gear shifting processes can be controlled in principle with only one electric motor. In this design, which is evaluated for example in the descriptive introduction of DE 102 06 561 A1, the operating device of the motor vehicle transmission device has a so-called selector drum, which is situated so that it can rotate and in whose outer jacket there are curtain-like grooves. The internal gear shifting system or final output mechanisms, each having a shift fork, are operated in this design by means of the selector drum. To this end elements coupled with the shift forks engage the curtain-like grooves; as the selector drum rotates they slide into these curtain-like grooves in such a way that their coupling with the shift forks and the latter's coupling with gear clutches brings about gear change processes. In this design the shifting sequence of the gear ratio steps or gears is determined by the design of the grooves.

SUMMARY OF THE INVENTION

In accordance with an embodiment of the present invention, the present invention provides a motor vehicle transmission actuator for operating a motor vehicle transmission having various gear wheel sets that form gears. The motor vehicle transmission actuator comprises of at least one main operating part with at least one main operating element for producing positioning movements to engage gears in the motor vehicle transmission. The at least one main operating part is movably situated in such a way that the at least one main operating element situated on the at least one main operating part is movable in a selecting direction to select gears and is movable in a shifting direction to engage gears. At least one movably situated auxiliary operating part with at least one auxiliary operating element is provided for producing positioning motions to disengage gears in the motor vehicle transmission; and exactly one electric motor is provided for driving the main operating element in the shifting direction and-for driving the main operating element in the selecting direction and for driving the at least one auxiliary operating part with the at least one auxiliary operating element. The at least one main operating part and the at least one main operating element situated on the at least one main operating part are movable relative to the at least one auxiliary operating part and the at least one auxiliary operating element situated on the at least one auxiliary operating part.

BRIEF DESCRIPTION OF THE DRAWINGS

Exemplary embodiments or an exemplary embodiment of the invention will now be explained in greater detail without intending to limit the invention thereby. This exemplary embodiment also produces particular advantages. The drawing shows the following:

FIGS. 2b through 2d: an exemplary distribution of functional surfaces on the nuts, referring in particular to the design according to FIG. 2a;

FIG. 1 shows the basic principle of an exemplary design according to the invention, in partially schematic view.

DETAILED DESCRIPTION

Figure 6:
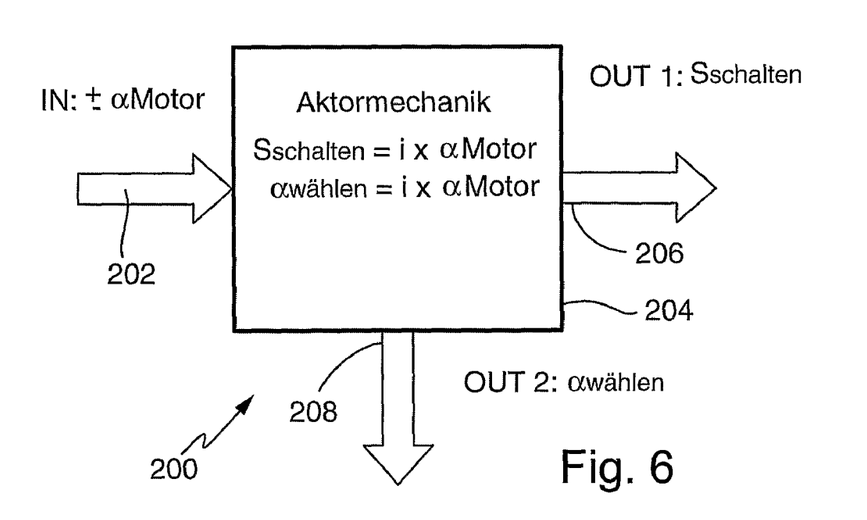
FIG. 6: a design that represents the Applicant's internal state of the art.

A design has been developed by the Applicant which can be described as a single-motor transmission actuator, and whose basic principle will be explained below on the basis of FIG. 6. However, since this design probably represents internal state of the art, the Applicant reserves the right to claim protection for this design. A single-motor transmission actuator 200 has exactly one electric motor, which is indicated schematically in FIG. 6 by the arrow 202 and the value "IN." This electric motor 202 is coupled to an actuator mechanism, which is indicated schematically in FIG. 6 by the "black box" 204. The electric motor or its motor shaft can be turned or driven in the two opposing directions of rotation. "Shifting" is assigned to one of these two directions of rotation, and "selecting" is assigned to the other of these two directions of rotation. The actuator mechanism ("black box" 204) performs a shift to the respective output drive 206 or 208, depending on the direction of rotation of the motor, and carries out a corresponding kinematic change of transmission ratio.

An advantage of various embodiments of the invention is to provide a reliably operating motor vehicle transmission actuator, a reliably operating control device for a motor vehicle transmission, and a reliably operating motor vehicle transmission device, which where appropriate will make the shifting of gears possible in a manner in which the shifting sequence of the gears when upshifting and downshifting is not determined in a sequence unambiguously prescribed by a mechanism, and which if appropriate makes possible the use of exactly one drive appliance, such as an electric motor, for this device or actuator.

In accordance with the known embodiments of various invention a motor vehicle transmission is provided which is designed in particular so that it has various wheel sets or gear wheel sets. These gear sets form gears or transmission ratio steps.

The motor vehicle transmission actuator has at least one main operating part, in particular one that is movably situated, at least one auxiliary operating part—in particular one that is movably situated—and exactly one electric motor. The main operating part or each main operating part has at least one main operating element or (main operating) functional area. The main operating part or (main operating) functional area or main operating element or one main operating element in each case, may produce positioning motions for engaging gears in the motor vehicle transmission. The main operating element or (main operating) functional area is movably situated in such a way that it is movable to select gears in a selecting direction, and movable—in particular to engage a selected gear—in a shifting direction. The (or each) auxiliary operating part has at least one auxiliary operating element or (auxiliary operating) functional area. At least one auxiliary operating part or at least one auxiliary operating element or (auxiliary operating) functional area(s), may produce positioning motions to disengage gears in a motor vehicle transmission. Exactly one electric motor may drive the main operating element(s) or (main operating) functional area(s) in a (respective) shifting direction, as well as in a selecting direction. Furthermore, the at least one auxiliary operating part with its at least one auxiliary operating element or (auxiliary operating) functional area is driven by exactly one electric motor. The provision is made in particular that the at least one main operating part with the at least one main operating element or (main operating) functional area may be movably situated vis-à-vis the at least one auxiliary operating part and the at least one auxiliary operating element or (auxiliary operating) functional area situated on it.

It may thus also be provided that a plurality of main operating parts are provided, in particular two, where one main operating part has at least one first operating element and where a second main operating part has at least one second main operating element. At the same time there may be provision that this first main operating part with the at least one first main operating element is situated so that it is movable relative to this second main operating part with its second main operating element. Furthermore, it may also be provided in a design of the forenamed type that a plurality of auxiliary operating parts are provided, in particular two, where one first auxiliary operating part has at least one first auxiliary operating element, and where a second auxiliary operating part has at least one second auxiliary operating element. In a preferred refinement of such a design it is provided that the first auxiliary operating part with the at least one first auxiliary operating element may be situated so that it is movable relative to the second auxiliary operating part with the at least one second auxiliary operating element.

An especially preferred embodiment may include the provision that the main operating parts with their respective at least one main operating element are situated so that they are movable in the shifting direction relative to the auxiliary operating part or parts with their respective at least one auxiliary operating element. In particular, it may be provided here that at least one main operating part with at least one main operating element situated on it is essentially firmly coupled in the selecting direction opposite at least one auxiliary operating part with at least one auxiliary operating element situated on it. For example, it may be provided that the shifting direction is an axial direction and the selecting direction is a rotational direction. The rotational direction may for example be such that the axis of rotation lies in the direction of the aforementioned axial direction or parallel thereto.

In accordance with certain embodiments of the present invention a motor vehicle transmission actuator is provided having a first main operating part, a second main operating part and at least one movably situated auxiliary operating part. The first main operating part having at least one first operating element, and the second main operating part having at least one second main operating element. The first main operating part or the at least one main operating element may produce positioning motions to engage gears in the motor vehicle transmission. Here the first main operating element is preferentially designed for engagement with a shift gap of an internal gear shifting system of a motor vehicle transmission. An exemplary design of such an internal transmission shifting system will be explained below. The first main operating part may be situated movably in such a way that the at least one main operating element situated on it is movable in a selecting direction to select gears and in a shifting direction to engage a selected gear. The second main operating part with the second main operating element is in particular correspondingly designed as was described earlier in reference to the first main operating part with the at least one first main operating element.

The at least one auxiliary operating part has at least one auxiliary operating element. The auxiliary operating part or auxiliary operating element may produce positioning motions to disengage gears in a motor vehicle transmission. Here it may be provided in particular that the auxiliary operating element or elements engage a shift gap or shift gaps of an internal transmission shifting system of the motor vehicle transmission, in order to disengage gears.

The first main operating part with its at least one first main operating element may be movable relative to the second main operating part with its at least one second main operating element. It may also be provided for example that the motor vehicle transmission actuator has a plurality of auxiliary operating parts, in particular two, with these auxiliary operating parts each having at least one auxiliary operating element. For example, it may also be provided that a first auxiliary operating part is provided with at least one first auxiliary operating element, and a second auxiliary operating part is provided with at least one second auxiliary operating element.

For example, it may be provided here that these two auxiliary operating parts with their auxiliary operating elements are each situated so that they are movable relative to the first main operating part, and/or to the second main operating part if two such main operating parts are provided.

In a preferable design, at least one of the main operating parts, or the main operating part, or all of the main operating parts may be designed as spindle nuts. It is also preferred that at least one of the auxiliary operating parts, or an auxiliary operating part, or all of the auxiliary operating parts may be designed as spindle nuts. It is provided here in particular that on each such main operating part designed as a spindle nut a main operating element is situated, or on each such auxiliary operating part designed as a spindle nut at least one auxiliary operating element is situated.

In an especially preferable design provides the motor vehicle transmission actuator may have a first spindle nut which is a first main operating part, a second spindle nut which is a first auxiliary operating part, a third spindle nut which is a second main operating part, and a fourth spindle nut which is a second auxiliary operating part. It is provided here in particular that on each of the named spindle nuts that are main operating parts at least one main operating element or (main operating) functional area is provided, or that on each of the spindle nuts that are auxiliary operating parts at least one auxiliary operating element or (auxiliary operating) functional area is provided.

It is especially preferred in particular with such designs that these spindle nuts may be designed as main or auxiliary operating parts be received by a threaded spindle. This may be in particular a threaded spindle which is provided with sections of thread which differ in their pitch or which have opposite pitch.

In accordance with various embodiments of the present invention a motor vehicle transmission actuator for operating a motor vehicle transmission is provided, having a threaded spindle that has at least one first threaded section which may be designed with right-hand thread, and at least one second threaded section which may be designed with left-hand thread. That is, it is provided in particular that this threaded spindle may have at least one threaded section with positive pitch and at least one threaded section with negative pitch.

A motor vehicle transmission actuator of this sort, in which a threaded spindle is provided that has at least one threaded section with positive thread pitch and at least one section with negative thread pitch, or in which one zone is provided in which the thread is designed as right-hand thread as well as one section in which the thread is designed as left-hand thread is, in an especially preferred design, a preferred refinement of the designs already described earlier. Preferably, the motor vehicle transmission actuator has a plurality of spindle nuts which are received by the threaded spindle. In an advantageous design, at least one such spindle nut may have a main operating part and at least one such spindle nut may have an auxiliary operating part. Another preferred design provides four such spindle nuts, where—as also described earlier—two such spindle nuts may each be a main operating part and two such spindle nuts may each be an auxiliary operating part.

Another advantageous design provides a motor vehicle transmission actuator having exactly one electric motor. It is provided in particular in this case that the main operating part or parts and the auxiliary operating part or parts, or the main operating element or elements and the auxiliary operating elements may be driven by this exactly one electric motor. This may also occur in particular with designs in which the main operating element or elements are each situated on a main operating part or parts, each of which is designed as a spindle nut, or in which the auxiliary operating element or elements are situated on one or more main operating parts which are designed as spindle nuts—in particular as described above. It may be provided here that the named spindle nuts are drivable by the electric motor. In particular, the invention provides all of these spindle nuts may be driven by the exactly one electric motor. In particular it is provided here that the main operating elements may be driven by the exactly one electric motor in the shifting direction and in the selecting direction, and in particular optionally. Furthermore, it may be provided in particular that the auxiliary operating parts which are designed in particular as spindle nuts, or the auxiliary operating elements, may be driven by this exactly one electric motor which also drives the main operating parts or the main operating elements.

In one advantageous design, the respective main operating elements that are assigned to a predetermined main operating part may be made in a single piece with that particular main operating part. Also especially preferred is that the auxiliary operating elements that are assigned to a predetermined auxiliary operating part may be made in a single piece with that respective auxiliary operating part.

Another preferable design that provides the motor vehicle transmission actuator may be designed in such a way that the sequence of the gears of a transmission is not defined as a certain sequence by the design of the transmission actuator, in particular a certain sequence when shifting up and/or a certain sequence when shifting down. It may be provided in particular that the motor vehicle transmission actuator is designed in such a way that at least four gears may be engaged in a transmission by this motor vehicle transmission actuator, the transmission actuator being designed so that at least one of these gears may optionally be shifted into any one of the—for example three—remaining gears.

Another advantageous design, the electric motor of the transmission actuator may have a driving connection with the threaded spindle. It is particularly true that this threaded spindle is drivable by means of this electric motor, and indeed in particular is rotationally drivable. In an especially preferred design, it is preferred that the electric motor may have a motor shaft or motor output shaft or drive shaft, this shaft being positioned parallel to the spindle. In particular, it may be provided here that it extend concentrically to the spindle. It may also be provided that a transmission stage or a plurality of transmission stages be provided between this shaft of the electric motor and the spindle. In an especially preferable design, it is provided that the threaded spindle may be supported so that it is rotationally movable and axially fixed.

Another especially preferable design provides that the auxiliary operating parts, or the spindle nuts that form the auxiliary operating parts, which are situated on the threaded spindle, may be uncouplable from this threaded spindle in such a way that a driving connection between them or these spindle nuts or auxiliary operating parts and the threaded spindle is interrupted. This may be designed for example in such a way that the thread on which the corresponding spindle nut or auxiliary operating part sits is interrupted by a threadless section, or that a threadless section of the surface area of the threaded spindle is provided at the end of such a threaded section. This corresponding section is in particular dimensioned so that in each instance an auxiliary operating element, or a spindle nut which is an auxiliary operating part, may be moved with its threading into this zone, so that threading of this auxiliary operating part or threaded nut does not engage a threading of the threaded spindle. It may be provided further that this zone is adjoined by a zone in which threading is provided, so that the corresponding auxiliary operating element or the corresponding threaded nut may be moved from the threadless zone into such a threaded zone, so that in this threaded zone a threading of the threaded spindle engages a threading of the threaded nut or of the auxiliary operating part, so that a driving connection exists.

In particular, it may be provided that two auxiliary operating parts, or two spindle nuts which form auxiliary operating parts and that a threadless section of the forenamed type for the forenamed purpose for each of these two auxiliary operating parts. In particular, this may be done so that one of these spindle nuts or auxiliary operating elements engages a right-hand thread and the other a left-hand thread, there being threadless zones adjoining the zone with right-hand thread and the zone with left-hand thread, or the zone with right-hand thread and the zone with left-hand thread each being interrupted by a threadless zone.

Another preferred design provides the motor vehicle transmission actuator having a first auxiliary operating part and a second auxiliary operating part, the first auxiliary operating part being of mirror-symmetrical design with respect to a plane located between this first auxiliary operating part and the second auxiliary operating part. This plane may be in particular a plane located in the middle between these first and second auxiliary operating parts, in particular a plane located in the axial direction between these parts. The symmetry may be such that it refers to the design of the auxiliary operating elements on the first auxiliary operating part and on the second auxiliary operating part. It may provide the entire first auxiliary operating part is designed symmetrical to this second auxiliary operating part with respect to the aforementioned plane. Here too—as with all of the other embodiments of the invention—preferably the first auxiliary operating part is designed as a spindle nut and the second auxiliary operating part is designed as a spindle nut. In a preferred design, it is provided that a first auxiliary operating part and a second auxiliary operating part are motion-coupled or integrated into the transmission actuator in such a way that the second auxiliary operating part is moved simultaneously with a motion or each motion of the first auxiliary operating part, and indeed mirror-symmetrically in particular with respect to a plane located between the first and the second auxiliary operating parts.

It is also preferred that the first main operating part and the second main operating part may be motion-coupled or integrated into the transmission actuator in such a way that at every motion of the first main operating part the second main operating part is moved simultaneously with it, and indeed in particular mirror-symmetrically with respect to a plane located between the first and the second main operating parts.

Also preferred is that the first main operating part be designed mirror-symmetrical to the second main operating part with respect to a plane located between these first and second main operating parts. This symmetry may exist in particular aside from the main operating elements that are situated on the first or second main operating parts. For example, it may be provided that the first and the second main operating parts be designed so that they are twisted with respect to an axis that is positioned perpendicular to the named plane of symmetry, so that because of this twisting there is no longer mirror symmetry, which however would exist at a different torsional angle.

Preferably, the first main operating part and the second auxiliary operating part engage the first thread zone of the threaded spindle, and the second main operating part and the first auxiliary operating part engage the second thread zone of the threaded spindle, the first thread zone being designed as right-hand thread and the second thread zone being designed as left-hand thread or vice versa. The first thread zone may also be interrupted by a threadless zone, or the second thread zone may be interrupted by a threadless zone.

In another advantageous design, it may be provided that the main operating part or parts are situated so that they are axially movable for shifting and rotationally movable for selecting. Here it is provided in particular that the axial direction assigned to the axial movability may lie in the direction of the longitudinal axis of the threaded spindle, and that the rotational movability is designed so that the longitudinal axis of the threaded spindle constitutes the axis of rotation.

Preferably, at least one auxiliary operating part may be coupled with a housing in a rotationally fixed connection by a first antirotation block. The housing in this case may be for example a transmission actuator housing or transmission housing or the like. In particular, it may be provided that this first antirotation block is releasable. This releasability may for example be such that the first antirotation block acts on the auxiliary operating part only in a certain position range of this auxiliary operating part. This position range may be in particular an axial position range. Thus it may be provided, for example, that the auxiliary operating part may be moved axially in an axial position range, and at the same time be coupled to the housing in a rotationally fixed connection by the first antirotation block, whereas if this auxiliary operating part is moved axially out of the forenamed range the first antirotation block no longer acts on it, so that the auxiliary operating part may then be rotationally movable. It may be provided that in such a range, in which the first antirotation block no longer acts on the auxiliary operating part, a free-wheeling mechanism acts on this auxiliary operating part, and specifically in particular a unilaterally operating free-wheeling mechanism. This may occur in such a way that for example at a rotation of the spindle, whose orientation is such that an auxiliary operating part designed as a spindle nut is moved out of the range of influence of the first antirotation block, as the spindle continues to rotate in this direction the free-wheeling function appears. In the opposite direction of motion of the spindle it may be provided then that the blocking function of such a free wheeling mechanism operates so that the auxiliary operating part may be moved axially at a rotary or swiveling movement of the spindle. This may be in particular such that as motion continues in the contrary direction or counter-rotational direction of the spindle, the auxiliary operating part again comes into engagement with the first antirotation block in such a way that a twisting of the auxiliary operating part is prevented as the motion continues. The first antirotation block is in particular such that it enables an axial movement of the first auxiliary operating part.

These configurations may also be designed in particular as mirror symmetrical, so that two first antirotation blocks may be provided, one of which is provided for a first auxiliary operating part and another of which is provided for a second auxiliary operating part. At the same time, it may be provided that a free-wheeling mechanism of the forenamed exemplary type is provided for the first and the second auxiliary operating parts as a separate free-wheeling mechanism in each case, or that one common free-wheeling mechanism is provided. However, it may also be provided that such a free-wheeling mechanism is absent.

In an especially preferable design it may be provided that at least one main operating part is coupled with at least one auxiliary operating part in a rotationally fixed connection. In particular with such a design, however, an axial mobility exists between the aforementioned main operating part and the aforementioned auxiliary operating part. A second antirotation block may be provided for example for this rotationally fixed coupling. This may be designed in the nature of gearing or splining, for example, where appropriate teeth are provided on the main operating part, and corresponding teeth that interact with the forenamed teeth are provided on the auxiliary operating part. Such a design may exist in particular by pairs, which means in particular that a first main operating part is may be coupled with a first auxiliary operating part in a rotationally fixed connection through such a second antirotation lock, and a second main operating part may be coupled with a second auxiliary operating part in a rotationally fixed connection through such a second antirotation lock, which in particular may be different from the forenamed second antirotation lock. The rotationally fixed coupling between the main operating part and the auxiliary operating part, or between the respective main operating part and the respective auxiliary operating part, may in particular be designed so that it is effective over the entire repositioning range of the respective main operating part and/or the respective auxiliary operating part.

Preferably, the motor vehicle transmission actuator may be designed so that by means of this motion vehicle transmission actuator gears of a transmission may be shifted in essentially any sequence desired. It is also preferred that the motion vehicle transmission actuator be designed as a motor vehicle transmission actuator for a double clutch transmission or parallel shift transmission (PST). It may also be provided that the motor vehicle transmission actuator may be designed for an automated manual transmission (AMT).

In a preferred design, the motor vehicle transmission actuator may be designed so that it guarantees an active interlock functionality, or guarantees an active interlock functionality in interaction with an internal transmission shifting system of a motor vehicle transmission or of a motor vehicle transmission device. Hence it is provided in particular that the motor vehicle transmission actuator—in particular in interaction with an internal transmission shifting system of a motor vehicle transmission or with an internal motor vehicle transmission—may be designed so that an existing gear is disengaged only after selecting, and in particular before the new gear is engaged. In particular, it is provided that the main operating element may be moved back into its neutral position after a gear is engaged, without the previously engaged gear being disengaged in the process. This refers of course in particular to the interaction with an internal transmission shifting system of a motor vehicle transmission or with an internal motor vehicle transmission device. In particular, it is provided here that such an internal transmission shifting system has a plurality of mechanisms, each of which has at least one shift gap. For example, it may be provided that the respective mechanisms of such an internal transmission shifting system, which can also be referred to as final output mechanisms, each have a shift rail or shift fork or the like. This may be in particular a shift fork or shift rail or the like that has a shift gap. In particular, it may be provided that the motor vehicle transmission actuator may operatively intervene in each particular shift rail via the respective shift gap. It should be noted, however, that instead of such shift gaps corresponding elements of different design may also be provided, such as for example projecting parts or the like, which enable operation by a transmission actuator or the latter's main and auxiliary operating elements. In particular, it may be provided that the auxiliary operating elements serve exclusively to disengage gears, so that no gears are engaged or may be engaged by the auxiliary operating elements. The main operating elements serve in particular to engage a corresponding gear or gears.

With regard to the preferred design of an active interlock, reference may be made in particular to the remarks in the description introduction, and also in particular to the existing art described there, whose disclosure and explanations referring to the active interlock is made entirely into the subject of preferred designs with regard to the design of an active interlock or a component of such an active interlock, and consequently is incorporated into the content of the present disclosure by reference.

It is especially preferred, however, that the corresponding geometries be situated on spindle nuts or on main or auxiliary operating elements situated thereon, i.e. in particular not on the shifting shaft or the like itself, and on the other hand on shift gaps or corresponding projections or the like which are situated on shift rails or the like.

In accordance with various embodiments of the present invention, an operating device is provided having a motor vehicle transmission actuator, which be designed in particular as explained in conjunction with this disclosure. Furthermore, the operating device has a plurality of mechanisms that may also be referred to as end output mechanisms, which are operable by this transmission actuator for engaging and disengaging gears. Each of these mechanisms has at least one shift gap or at least one engagement zone, through which that particular mechanism may be operable by the motor vehicle transmission actuator.

The aforementioned mechanisms or final operating mechanisms may—as mentioned earlier—have an axially movable shift rail or a shift fork or the like. In particular, it is provided that these aforementioned mechanisms or final output mechanisms may all be situated between the motor vehicle transmission actuator and gear clutches, which gear clutches may produce rotationally fixed connections between an idle wheel of the gear set of the transmission and a shaft to engage a gear, and may release them to disengage a gear. Each of the final output mechanisms or mechanisms may have for example a sliding sleeve or the like, which can also be in particular a component of such a gear clutch.

The aforementioned mechanisms or final output mechanisms form in particular the internal transmission shifting system or may be part of the internal transmission shifting system.

In an especially preferred design it may be provided that the maximum stroke of at least one main operating element and/or main operating part is greater than the maximum stroke of at least one auxiliary operating element and/or auxiliary operating part. At the same time it may be provided in particular that the corresponding stroke or maximum stroke exists in particular in the direction in which the shift rails or the like are situated so that they are axially movable, or in the shift direction.

It may be for example that, starting from a neutral position, the respective main operating part or auxiliary operating part may be deflected axially. It may be provided for example that the maximum stroke of the main operating parts or of at least one main operating part here is twice as great as the maximum stroke of at least one auxiliary operating part or of the auxiliary operating parts. It may also be provided that two main operating parts and two auxiliary operating parts are provided, where the two main operating parts and the two auxiliary operating parts, when moving in the direction of their respective maximum stroke, are moved away from each other, starting from their respective neutral positions.

In accordance with various embodiments of the present invention a motor vehicle transmission device is provided having in particular an operating device according to the design or to a design explained in this disclosure. This operating device in turn has in particular an internal transmission shifting system as well as a motor vehicle transmission actuator. Furthermore, the motor vehicle transmission device has in particular a plurality of gear wheel sets to form gears.

The motor vehicle transmission device may be designed in particular as a double clutch transmission or parallel shift transmission. In such a motor vehicle transmission device designed as a double clutch transmission or parallel shift transmission, it may be provided in particular that the motor vehicle transmission device has two sub-transmissions. A first of these sub-transmissions is connected parallel to a second of these sub-transmissions. In each of these sub-transmissions there may be gear wheel sets provided to form gears. These gear wheel sets may be situated in each case in particular between two shafts, there being gear clutches provided by a gear wheel of each gear wheel set may be coupled with one of the shafts in a rotationally fixed connection, or may be released.

In a preferred design, the motor vehicle transmission device may be designed so that the motor vehicle transmission device or the motor vehicle transmission actuator may select a selection position in which all gears of the transmission—or of a particular sub-transmission, if the transmission is designed as a double clutch transmission or parallel shift transmission—may be disengaged. In a double clutch transmission or parallel shift transmission it may be provided that the motor vehicle transmission device may be designed so that in both sub-transmissions all of the gears are disengaged in a predetermined selection position, which may be set.

In accordance with various embodiments of the present invention, a motor vehicle power train is provided having for example a combustion engine, or may be operable by such an engine. In addition, it may have drive axles of a motor vehicle.

In particular, it may be provided that the transmission device or the motor vehicle power train according to the invention has a start-up clutch. In the case of a motor vehicle transmission device designed as a double clutch transmission or parallel shift transmission, it may be provided in particular that two such start-up clutches are provided. In particular, it may be that one clutch is a start-up clutch and the other clutch is a load-shifting clutch.

Figure 1:
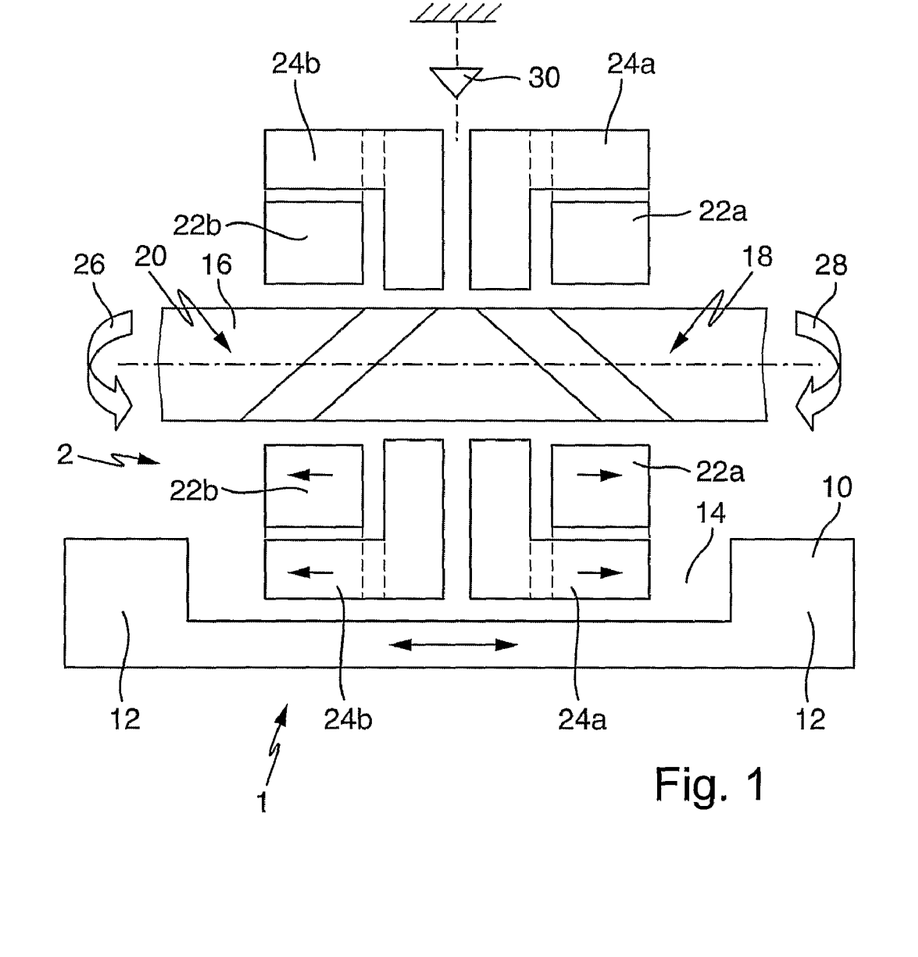
FIG. 1: the basic principle of an exemplary design according to the invention, in partially schematic view.

Turning now to the Figures, FIG. 1 shows an operating device 1 for a motor vehicle transmission. This operating device 1 has a motor vehicle transmission actuator 2. Furthermore, the operating device 1 has a plurality of final output mechanisms or mechanisms 10 or shift rails 12 that differ from the motor vehicle transmission actuator 2, of which one is depicted in FIG. 1, or partially depicted.

The motor vehicle transmission actuator 2 has a (threaded) spindle 16. This threaded spindle 16 is designed here so that it has at least one first thread section 18, which is designed as right-hand thread, as well as a second thread section 20, which is designed as left-hand thread, or so that starting from the middle it has a positive and a negative spindle pitch or thread pitch. The aforementioned "middle" can be the middle in the actual senses of the word; but it can also be provided for example that the "middle" is a position or an area between the positive and the negative thread pitch.

Situated on the threaded spindle 16, in particular movably, are a plurality of nuts or spindle nuts or threaded nuts 22a, 22b, 24a, 24b. In particular, it is provided that a first nut 22a is a first main operating part, a second nut 24a is a first auxiliary operating part, a third nut 22b is a second main operating part and a fourth nut 24b is a second auxiliary operating part.

The "b" nuts or elements here represent in particular a mirroring of the "a" nuts or elements. Thus it is provided in particular that the (third) nut 22b represents a reflection of the (first) nut 22a, and the (fourth) nut 24b represents a reflection of the (second) nut 24a.

The (first) nut 22a is rigidly or essentially rigidly coupled with the (second) nut 24a in the circumferential direction, or is rigidly or essentially rigidly coupled in reference to a rotation around the longitudinal or rotational axis of the spindle 16. The (third) nut 22b is rigidly or essentially rigidly coupled with the (fourth) nut 24b in the circumferential direction, or is rigidly or essentially rigidly coupled in reference to a rotation around the longitudinal or rotational axis of the spindle 16.

Operating device 1 is drivable by an electric motor or exactly one electric motor, not shown in FIG. 1. In FIG. 1 the arrows 26 and 28 represent schematically the input size (angle of rotation and torque of the electric motor), the shifting being assigned to one arrow 26 or 28 and the selecting being assigned to the other, in particular oppositely placed arrow 28 or 26. The nuts 22a, 22b, 24a, 24b move or can move on the spindle 16.

Furthermore, a circumferential latch 30 or a device of equivalent or similar function is provided. The circumferential latch 30 supports the torque, and with the appropriate input rotation angle effects an axial movement of the nuts 22a, 24a to the right or of the nuts 22b, 24b to the left. This axial movement can be transmitted on the shift bars. The nuts 24a, 24b here should complete only one shifting travel or only a single shifting travel of axial movement to disengage gears. Then nuts 22a, 22b each complete twice the distance or shifting travel, in order to shift gears following the disengagement. If the gear or a destination gear is shifted, the input rotation angle is changed. The nuts 24a and 22a or 24b and 22b move axially toward each other under the effect of the latch 30. After the nuts 24a/22a or 24b/22b meet, the force of the latch 30 is overcome and the nuts 24a and 22a or 24b and 22b rotate as a unit together with the spindle 16.

In particular, it is provided that nuts 22a, 22b, 24a, 24b have functional areas, or that nuts 22a and 22b each have at least one main operating element, and that nuts 24a, 24b each have one or more auxiliary operating elements. In particular, this can happen in that these main operating elements form functional areas or that functional areas are provided on these main operating elements, and that these auxiliary operating elements form functional areas or that functional areas are provided on these auxiliary operating elements.

It can be provided that a transmission is operable by means of the operating device that has a plurality of parallel-connected sub-transmissions, in particular two. Such a transmission can be in particular a parallel shift transmission (PST) or a double clutch transmission (DCT). But it can also be provided that a transmission is operable by means of the operating device 1 that does not have a plurality of parallel-connected sub-transmissions.

Figure 2A:
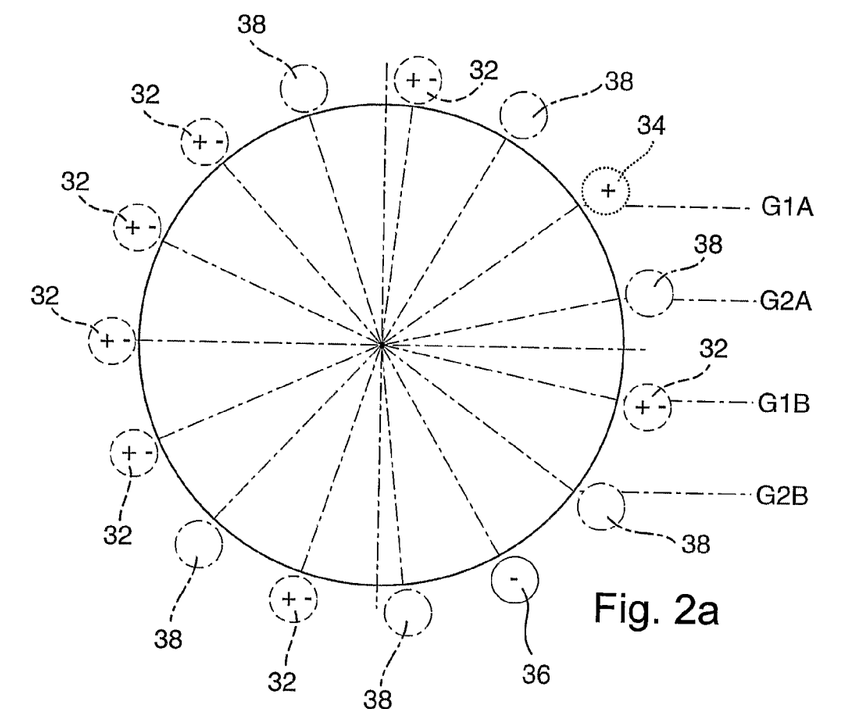
FIG. 2a: an exemplary projection of functional surfaces of nuts and exemplary positions of the shift rails in relation to the nuts, as can exist for example in the design according to FIG. 1 and/or in the design according to FIGS. 3 and 4 or 3 through 5.

FIG. 2a shows a projection of the functional surfaces of nuts 22a, 22b, 24a, 24b—or schematically or symbolically of the main and auxiliary operating elements—on a plane for an exemplary design according to the invention. The design explained on the basis of FIGS. 2a, 2b, 2c and 2d and shown there can exist for example in the exemplary embodiment according to FIG. 1 or in the exemplary embodiment according to FIGS. 3 through 5.

The functional areas "+−" or the functional areas 32 of the nuts 24a, 24b identified by the symbols "+−" are provided for disengaging gears within a sub-transmission or are needed for disengaging gears within a sub-transmission. The functional area "+" or the functional area 34 identified by the symbol "+" belongs to a nut or the nut 22a, and the functional area "−" or the functional area 36 identified by the symbol "−" belongs to a nut or the nut 22b, or vice versa. The "blank functional areas" 38, or the zones in which the circles in FIG. 2 are filled neither with a symbol "+−" nor with a symbol "+" nor with a symbol "−" are free spaces or indicate free spaces into which the shift rails of a neighboring sub-transmission can plunge.

The functional areas are present on the nuts 22a, 22b, 24a, 24b in an appropriate division, such as for example 360/15. This division or such a division offers the possibility of a selection position in which all gears of the transmission and/or sub-transmission together can be disengaged. This possibility can be of particular importance for example if—in a design with transmission control or electronic transmission control—this transmission control had a "blackout." So it is preferably provided that the functional surfaces or main and auxiliary operating elements are positioned on the respective nuts in such a way that—in particular in consideration of the position of the shift rails—in at least one predetermined selection position all of the gears of the transmission and/or sub-transmission together can be disengaged.

FIG. 2a shows in addition the positions of the shift rails 12 or exemplary positions for the shift rails 12 in relation to the nuts 22a, 22b, 24a, 24b and the division of the sub-transmissions G1 and G2. This is shown by way of example for a design with four shift rails 12, two of which (G1A, G1B) are assigned to a first sub-transmission G1 and two of which (G2A, G2B) are assigned to a second sub-transmission G2.

Figure 2B:
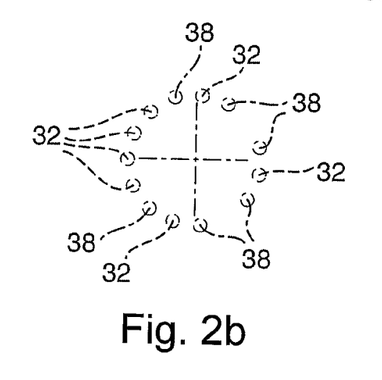
Figure 2C:
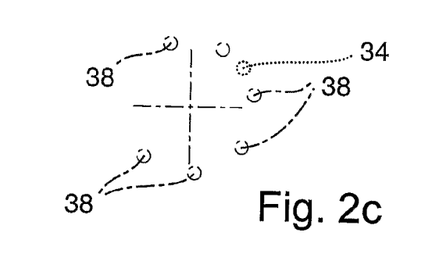
Figure 2D:
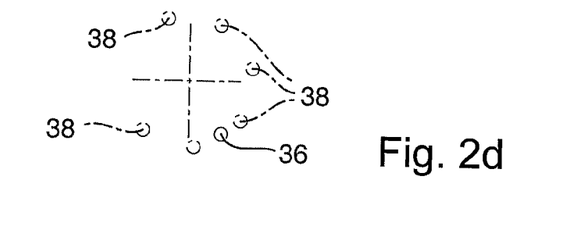

FIGS. 2b, 2c and 2d show the exemplary division or an exemplary division of the functional areas among the individual nuts 22a, 22b, 24a, 24b. These three figures refer to FIG. 2a. The division of the auxiliary operating elements or of the functional areas "+−" or 32 and of the "blank functional areas" 38 on the (second) nut 24a or on the first auxiliary operating part is shown by way of example in FIG. 2b. It is provided in particular that this division of the auxiliary operating elements shown in FIG. 2a or of the functional areas "+−" or 32 and of the "blank functional areas" 38 furthermore also exists on the fourth nut 24b or on the second auxiliary operating part. FIG. 2c shows by way of example the division of the main operating element or elements or functional areas "+" or 34 and of the "blank functional areas" 38 on the (first) nut 22a or on the first main operating part. FIG. 2c shows by way of example the division of the main operating element or functional areas "−" or 36 and of the "blank functional areas" 38 on the (third) nut 22b or on the second main operating part.

On the basis of FIGS. 3, 4a, 4b, 4c and 5, an exemplary design according to the invention will be explained below, which in particular may also be designed corresponding to FIGS. 1, 2a, 2b, 2c and 2d or can be designed corresponding to the basic principle explained on the basis of the last-named figure.

Figure 3:
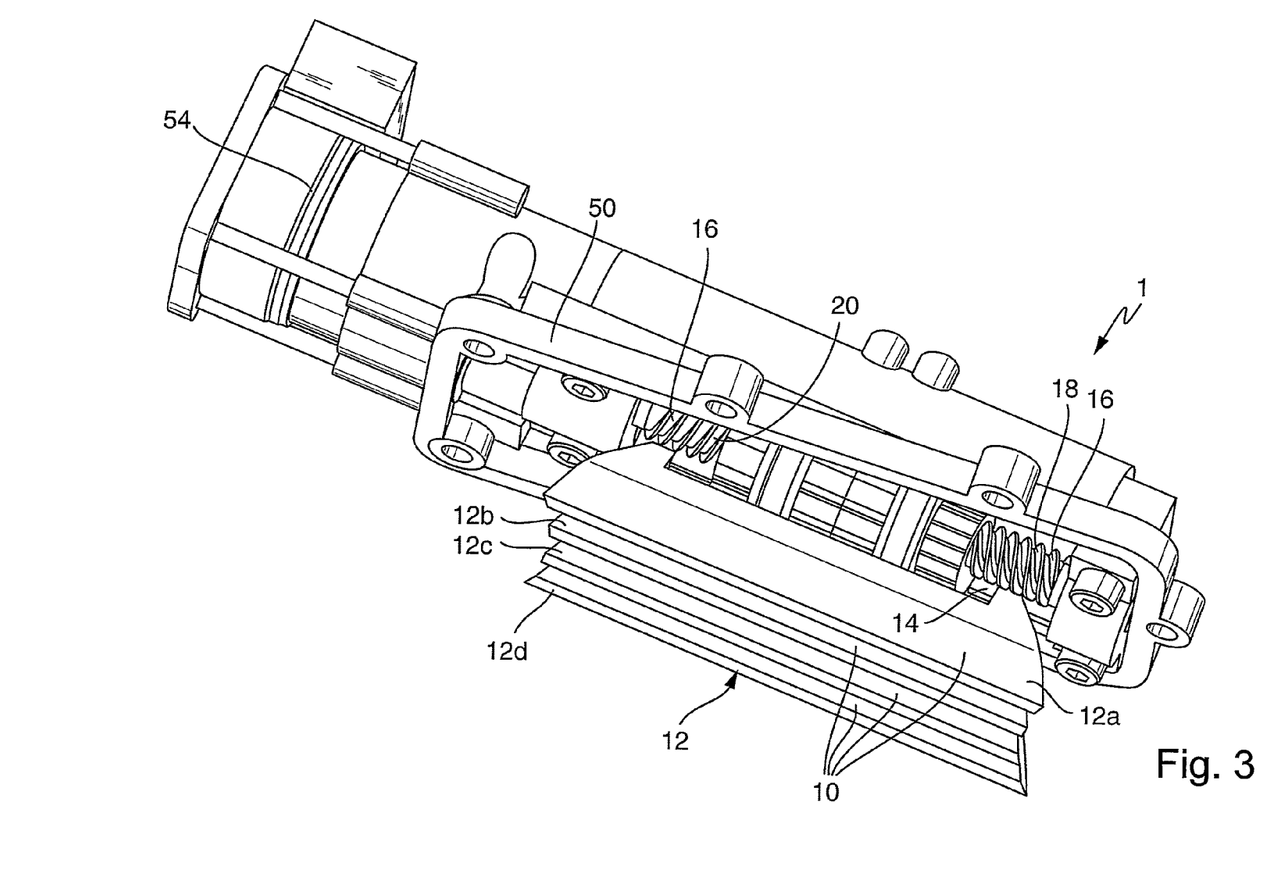
FIG. 3: a 3D view of an exemplary operating device according to the invention in partial depiction, or a 3D view of an exemplary embodiment according to the invention of a single-motor transmission actuator with partially visible shift rails.
Figure 4A:
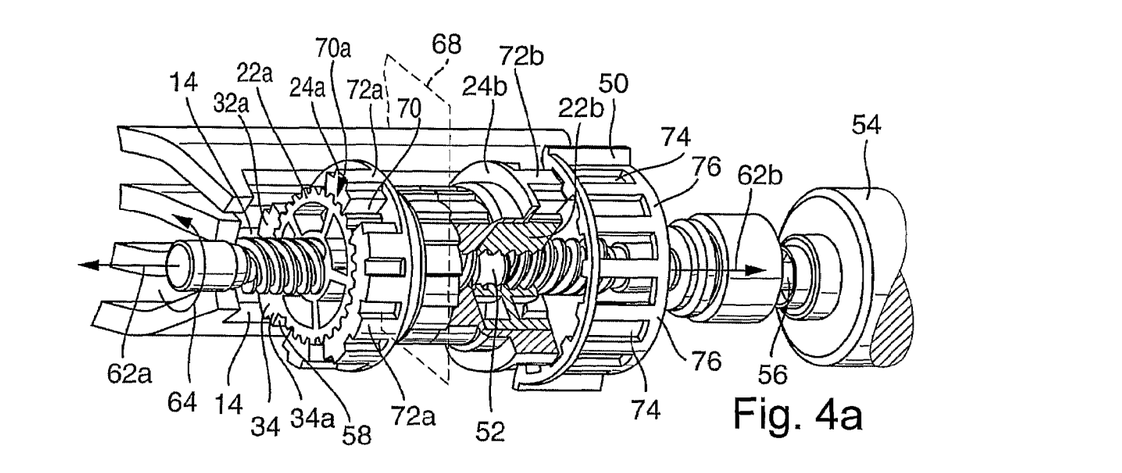
FIGS. 4a through 4c: in three detail views, the shifting sequence from the position "Neutral operation" (FIG. 4a), "Neutral transmission" (FIG. 4b) and "Gear shifted" (FIG. 4c)
Figure 4B:
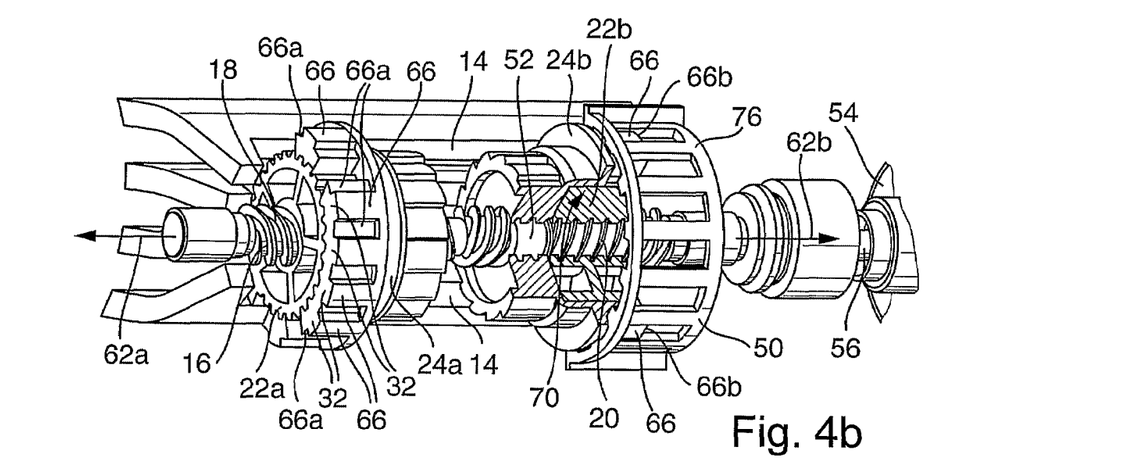
Figure 4C:
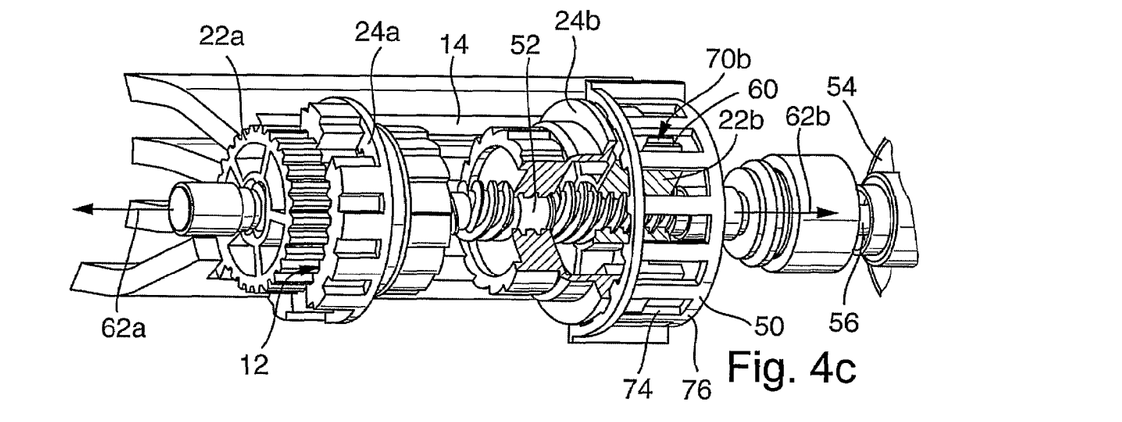

FIG. 3 shows a 3D view of an exemplary operating device 1 according to the invention in partial depiction, or a 3D view of an exemplary embodiment of a single-motor transmission actuator 2 according to the invention with partially visible shift rails 12, which are given the reference labels 12a, 12b, 12c and 12d here to make them easier to differentiate. The three detail views in FIGS. 4a, 4b and 4c are intended in particular to also explain the shifting sequence of the design shown in FIG. 3. FIG. 4a here shows the position "Neutral operation," FIG. 4b the position "Neutral transmission" and FIG. 4c the position "Gear shifted."

In this exemplary embodiment the operating device 1 has in particular the motor vehicle transmission actuator 2, as well as a plurality of final output mechanisms 10. These final output mechanisms 10 differ from the motor vehicle transmission actuator 2 and are operable by this motor vehicle transmission actuator 2. The totality of the final output mechanisms 10 can also be referred to as an internal transmission shifting system or as a component of an internal transmission shifting system.

Figure 5:
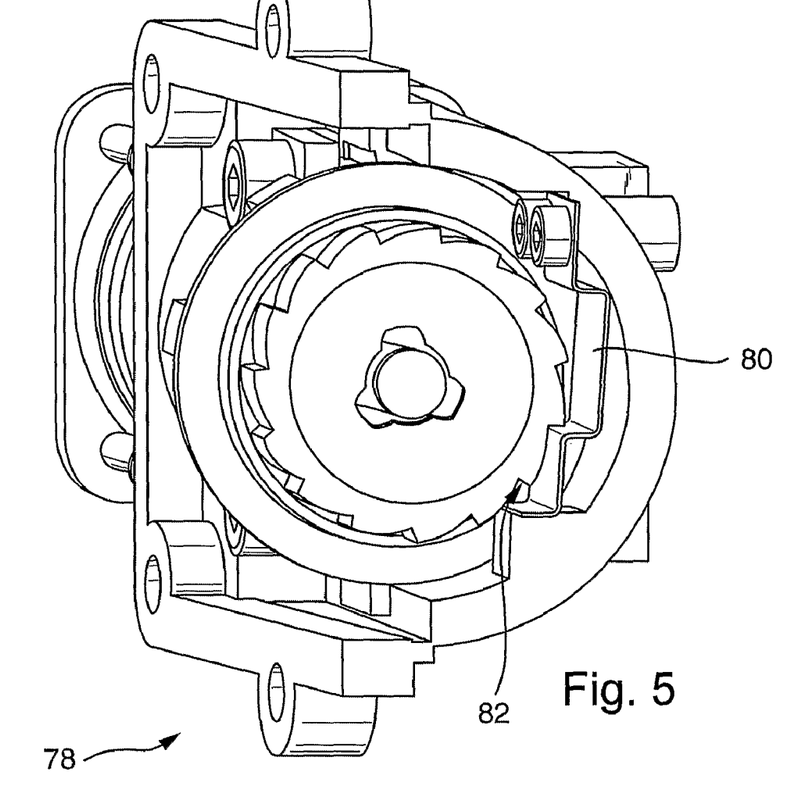
FIG. 5: an exemplary design of a free-wheeling mechanism, which may exist in particular in the design according to FIG. 1 or FIGS. 1 and 2 or according to 3 and 4.

One design of such final output mechanisms or mechanisms 10 is designed for example as follows: Each of these final output mechanisms or mechanisms 10 has a shift rail 12. It is intended in particular that by means of these final output mechanisms or mechanisms 10 for engaging or disengaging gears, influence can be exerted on gear clutches or functionally equivalent or functionally similar devices which are not shown. At the same time it can be provided that by means of these gear clutches or functionally equivalent or functionally similar devices rotationally fixed connections between gear wheels and a shaft can be produced and released. Each of these gear wheels not depicted in FIGS. 3 through 5 is assigned to a gear wheel set or a transmission stage. These gear wheel sets or transmission stages are intended for forming gears. This can be in particular such that to each of these gear wheel sets is assigned, along with a gear wheel of the forenamed type, i.e. a gear wheel that is situated rotationally movably vis-à-vis a shaft—and therefore can also be referred to as an idle wheel—and can be coupled to this shaft in a rotationally fixed connection by means of a gear clutch or functionally equivalent or functionally similar device, a gear wheel is assigned which is connected to another shaft in a rotationally fixed connection, or that each of these gear wheel sets has corresponding gear wheels. It is provided here in particular that these gear wheels and these shafts form an internal transmission or components of an internal transmission.

Each of the shift rails 12 has a shift gap 14, which is designed in this example as a penetration, which is open to one side in the circumferential direction—i.e. is not closed around the entire circumference. By way of these shift gaps 14, the final output mechanisms or mechanisms 10 or shift rails 12 are operable by the motor vehicle transmission actuator 2.

The motor vehicle transmission actuator 2 has a housing 50, which is partially removed in FIGS. 4*a*, 4*b* and 4*c*. Furthermore, motor vehicle transmission actuator 2 has a (threaded) spindle 16. This (threaded) spindle 16 has a first thread section 18, which is designed as right-hand thread, and a second thread section 20, which is designed as left-hand thread. First thread section 18 and second thread section 20 are each interrupted by a threadless zone or section. This threadless zone or section in reference to first thread section 18 is covered in FIGS. 3 through 4*c*, but can be recognized well in reference to second thread section 20 in FIGS. 4*a* through 4*c*. The threadless section in reference to this second thread section 20 is marked with reference label 52 in FIGS. 4*a* through 4*c*. An advantageous purpose of these threadless sections will be explained below.

Motor vehicle transmission actuator 2 also has an electric motor or exactly one electric motor 54. In the exemplary embodiment, the motor output shaft 56 of the electric motor 54 is situated concentrically to threaded spindle 16. However, there can also be one or more transmission stages connected between motor output shaft 56 and threaded spindle 16.

Threaded spindle 16 is situated so that it is axially fixed and rotationally movable, and can be driven by electric motor 54. Electric motor 54 is designed so that it can drive threaded spindle 16 in both directions of rotation. On threaded spindle 16 are a number of (spindle or threaded) nuts, specifically here in particular a first spindle nut 22*a*, a second spindle nut 24*a*, a third spindle nut 22*b*, and a fourth spindle nut 24*b*. These spindle nuts 22*a*, 22*b*, 24*a*, 24*b* mesh their respective threads with threads of the threaded spindle 16, although it must be noted in this respect that nuts 24*a* and 24*b* can also be moved in such a way that their thread is positioned in one of the threadless sections, so that their particular thread is not meshed with the thread of threaded spindle 16.

It is provided in the exemplary embodiment that the first nut 22*a* and the second nut 24*a* engage the first thread section 18 with their respective threads, and that the third nut 22*b* and the fourth nut 24*b* engage the second thread section 20 with their respective nuts. It must be noted in addition, however, that the second nut 24*a* and the fourth nut 24*b*—as mentioned earlier—can also be positioned so that their respective threads are positioned in the threadless section.

The first nut 22*a* can also be referred to as the first main operating part, or is one such; the second nut 24*a* can also be referred to as the first auxiliary operating part, or is one such; the third nut 22*b* can also be referred to as the second main operating part, or is one such; the fourth nut 24*b* can also be referred to as the second auxiliary operating part, or is one such. However, the explanation that follows will refer principally to the first through fourth nuts or threaded nuts or spindle nuts.

The first nut 22*a* or first main operating part has a first main operating element 58 or a first functional area 34—in particular one that is connected to it in a single piece. The third nut 22*b* or second main operating part has a second main operating element 60 or second functional area 36—in particular one that is connected to it in a single piece. This can be in particular such that the respective aforementioned functional areas 34 and 36 are each an area of the respective aforementioned main operating element 58 or 60, namely in particular a face, such as an outward-directed face.

As can be seen clearly from FIGS. 4*a* through 4*c*—and there in particular in reference to the first main operating element 58—it is provided in the exemplary embodiment that the main operating elements 58, 60 project radially outwardly on the corresponding nut 22*a* or 22*b*.

The first nut 22*a* and the third nut 22*b* are both situated movably in such a way that the respective main operating elements 58 or 60 situated on them or the functional areas 34 or 35 situated on them to select gears are movable in a selecting direction, and to engage a particular selected gear they are movable in a shifting direction. The respective shifting direction is indicated schematically by the arrows 62*a* or 62*b*. The selecting direction is indicated schematically by the arrow 64. It can be seen from this that the motion of the corresponding main operating element or part in the shifting direction corresponds essentially to an axial motion, while the motion in the selecting direction corresponds essentially to a rotary or swiveling motion. In reference to spindle 16, the selecting motion also corresponds essentially to a rotary or swiveling motion of this spindle 16, which is directed essentially in the direction of the arrow 64. The shifting motion on the spindle 16 corresponds to the rotary or swiveling motion of this spindle 16 that is oriented essentially counter to the arrow 64.

As already mentioned, motor vehicle transmission actuator 2 also has a second nut 24*a* or a first auxiliary operating part, as well as a fourth nut 24*b* or a second auxiliary operating part. The second nut 24*a* or the first auxiliary operating part has a plurality of auxiliary operating elements 66 or functional areas 32—in particular ones that are connected to it in a single piece. The fourth nut 24*b* or the second auxiliary operating part has a plurality of auxiliary operating elements 66 or functional areas 32—in particular ones that are connected to it in a single piece.

For better differentiation, the auxiliary operating elements 66 of the second nut 24*a* or of the first auxiliary operating part are also given the reference label 66*a*, and the auxiliary operating elements 66 of the fourth nut 24*b* or of the second auxiliary operating part are given the respective reference label 66*b*.

The first nut 22*a* or the first main operating part is situated so that it is movable relative to the third nut 22*b* or the second main operating part. Furthermore, these two main operating parts or the first nut 22*a* and the third nut 22*b* are each situated so that they are movable relative to the auxiliary operating parts or relative to the second nut 24*a* and the fourth nut 24*b*. The second spindle nut 24*a* or the first auxiliary operating element is also situated so that it is movable relative to the first spindle nut 24*b* or relative to the second auxiliary operating element. However, this does not mean—as will be seen—that there cannot be zones along the total positioning range in which the nuts are moved together.

The second nut 24*a* is situated and/or designed so that it is essentially mirror symmetrical in reference to a plane 68 that lies between the second nut 24*a* and the fourth nut 24*b*. The first nut 22a is situated and/or designed so that it is essentially mirror symmetrical in reference to a plane 68 that lies between the first nut 22a and the third nut 22b. At the same time, however, it is provided that the first main operating element 58 or functional area 34 of the first nut 22a is not situated or designed mirror symmetrical to the second main operating element or functional area 36; instead, these main operating elements 58, 60 or functional areas 34, 36 are situated so that they are offset from each other in the circumferential direction. This makes it possible in particular that influence can be exerted on a shift rail 12 by means of one of these functional areas 34, 36 or of one of these main operating elements 58, 60, in order to engage a gear in the transmission without this engaging of a gear being blocked by the other of these functional areas 34, 36 or the other of these main operating elements 58, 60.

Furthermore, it is provided in particular that the first 22a and third nuts 22b are situated in such a way and subjected to load by means of the spindle 16 so that they are (can be) moved essentially mirror symmetrically in reference to the plane 68. In a corresponding way, the second nut 24a and fourth nut 24b are situated and coupled in such a way that they also are (can be) moved essentially mirror symmetrically in reference to the plane 68 by means of the spindle 16.

The first nut 22a and the second nut 24a can both be subjected to load by the first thread section 18 or right-hand thread. In a corresponding way, the third nut 22b and the fourth nut 24b can both be subjected to load by the second thread section 20 or left-hand thread.

As can be seen readily for example in FIG. 4a, the first nut 22a is connected with the second nut 24a through gearing or a second antirotation block 70, which is also given the reference label 70a for better differentiation. This gearing 70a is in particular splining. In particular, it is provided on a surface of the nut 22a that faces radially outward that there are teeth situated which mesh in the circumferential direction between teeth that are provided on a surface of the nut 24a which is turned radially inward. This gearing or second antirotation block 70a is designed in particular so that it couples the nut 22a with the nut 24a in an essentially rotationally fixed connection over the entire positioning range. In addition, this gearing or second antirotation block is designed in particular so that it makes possible a relative motion of the first nut 22a with respect to the second nut 24a (in the axial direction). The third nut 22b is connected to the fourth nut 24b through gearing or a second antirotation block 70, which is also provided with the reference label 70b to distinguish it better from the gearing or second antirotation block 70a. The second gearing or second antirotation block 70b is preferably designed in reference to the nuts 22b, 24b essentially as was described earlier in reference to the second gearing or second antirotation block 70a and to the nuts 22a, 24a. The second gearing or second antirotation block 70b is hidden in FIGS. 4a through 4c. It should be noted that the second gearing or second antirotation block 70a here is separate from the second gearing or second antirotation block 70b.

The second nut 24a and fourth nut 24b each have teeth 72a and 72b, radially on the outside or on the outside diameter, respectively, which are meshed with slots 74 during the axial motion of the second nut 24a or fourth nut 24b; while these slots 74 for the fourth nut 24b are shown in FIGS. 4a through 4c, the correspondingly designed slots 74 for the second nut 24a are not shown. The slots 74 are situated here so that they are fixed with respect to the housing. This is accomplished here for example by the fact that for the second nut 24a a slotted plate 76—shown in FIGS. 4a through 4c—is provided which is firmly connected to the housing 50 or belongs to the housing 50, and for the fourth nut 24b a slotted plate 76—not shown in FIGS. 4a through 4c—is provided which is firmly connected to the housing 50 or belongs to the housing 50. These slotted plates 76 can be separate, or integrally connected to each other, or made in a single piece. These slotted plates 76 connected to the housing 50 each have here a plurality of slots 74 distributed around the circumference. These slots 74 are open axially toward one side, so that the teeth 72a or 72b can be moved axially into and out of the corresponding slotted plate. When the teeth 72a or 72b are positioned in it, the respective slotted plate supports the torque of the second nut 24a or fourth nut 24b (see in particular FIG. 4b). That ensures the axial propulsion, in particular the axial propulsion of the nuts 24a, 24b, or of the nuts 22a, 22b by means of the second gearings or a second antirotation lock 70. These designs of the teeth 72a, 72b and slots 74 or slotted plates 76 can also be referred to as first antirotation locks or first releasable antirotation locks. However, there can also be differently designed first (releasable) antirotation locks provided between the nuts 24a, 24b and the housing 50, which in particular are such that to disengage gears the nuts 24a, 24b are locked against rotation with respect to the housing 50, and for selecting they can be rotated or swiveled with respect to the housing.

Starting from the position shown in FIG. 4a, it is possible to move through the position shown in FIG. 4b to the position shown in FIG. 4c by turning the spindle 16 (always in the same direction of rotation). By subsequently reversing the direction of rotation, it is then possible starting from the position shown in FIG. 4c to move through the position shown in FIG. 4b to the position shown in FIG. 4a.

In the position of the nuts 24a, 24b depicted in FIG. 4a, the teeth 72a, 72b are not meshed with the slots 74. In this position the parts can also carry out a selecting motion, depending on the direction of rotation of the motor. In FIG. 4a the reference label 32a identifies a functional area 32 which is engaged with the shift rails to disengage the gears, and reference label 34a a functional area for engaging the gears.

In the depiction according to FIG. 4b or in the position shown in this figure the second nut 24a and the fourth nut 24b have lost their positive lock to the spindle 16, because their respective threads are positioned in a threadless section of spindle 16 or in a zone without gearing on the spindle. These nuts 24a, 24b therefore remain in their axial position.

FIG. 4c shows the operating mechanism or the operating device 1 or the motor vehicle transmission actuator 2 in the shifted final position. The nuts 22a, 22b have completed additional shifting travel, while the nuts 24a, 24b remain in their same axial position. The torque continues to be supported by the antirotation lock or gearing 70, through the gearing or teeth 72a or 72b and through the slotted plate 76 (or first antirotation lock) on the housing 50.

If the direction of rotation of the motor 54 is reversed, the nuts 22a, 22b first move toward each other. If they have reached an axial position as shown in FIG. 4b, the nuts 24a, 24b are again meshed into the gearing on the spindle and thereby acquire a positive lock. After that the nuts 22a, 22b and 24a, 24b move synchronously toward each other. If they collide, as shown in FIG. 4a, the torque is no longer supported on the gearing or the teeth 72a or 72b or the first antirotation lock. The nuts 22a, 22b, 24a, 24b and the spindle 16 are rotated into a new selecting position as a single unit.

In order to track the teeth 72a, 72b into the slots 74 for the shifting procedure, starting from the position depicted in FIG. 4a, temporary circumferential support of the nuts 24a, 24b on a free wheel mechanism is required, or it can be advantageous if the nuts 24a, 24b are supported temporarily on a free-wheeling mechanism. A free-wheeling mechanism 78 of a preferred design is provided for this purpose.

As FIGS. 4a through 4c make clear, nut 22a can be positioned radially inside of nut 24a, and nut 22b radially inside of nut 24b. Nut 22a can dip in particular into nut 24a, and nut 22b can dip in particular into nut 24b.

An exemplary design for such a free-wheeling mechanism 78 is shown in FIG. 5. The design according to FIG. 5 is given in an advantageous manner in the design according to FIGS. 3 through 4c. The free-wheeling mechanism according to FIG. 5 is formed by a sheet metal spring 80 and a profile 82, such as a sawtooth profile, or has a sheet metal spring 80 and a profile 82. The free-wheeling mechanism 78 fulfills the free-wheeling condition in the selecting direction and the blocking condition in the shifting direction. In this sense, the shifting direction is in particular the direction of rotation of spindle 16 in which this spindle must be turned to initiate the engaging of a gear, and the selecting direction is in particular the direction of rotation of spindle 16 in which it must be turned to select.

In order to be able to determine the selecting position of main operating elements 58, 60 and auxiliary operating element 66, with known designs of a single motor transmission actuator an additional rotational angle sensor is needed, it being possible on the basis of the signal from this rotational angle sensor to set the motor controller for the rotational angle position for the desired shifting position. Such a sensor can be saved according to the exemplary embodiment, for example by having the design of the profile 82 differ or vary along its periphery. For example, isolated parts of the profile can produce higher catching force, which can be detected by the motor controller. That gives one the possibility of sensing a reference during periodic rotation of main operating elements 58, 60 and auxiliary operating element 66. The incremental travel sensor inside the motor determines the rotational angle position of the main operating elements 58, 60 and auxiliary operating element 66. Let it be noted, however that a rotational angle sensor can also be used for example—in particular as an alternative.

In addition, the embodiment of the functional areas 32b on the faces of the nuts 24a, 24b offers the possibility of disengaging all of the gears in the transmission with one stroke in the event of a "blackout" of the motor controller. In that case the functional areas 32b must have a firm assignment to the reference on the profile 82, or advantageously they have such a firm assignment.

The design explained in the exemplary embodiment can be utilized for example for a double clutch transmission (DCT) or a parallel shift transmission (PST), or as a component of one of these.

As the exemplary embodiment shows, it is possible according to the invention to realize an operating unit or operating device for shifting a double clutch transmission, which is driven with only one electric motor. The operating unit or device is distinguished—at least in an advantageous design—by compact construction and only very few parts. By changing the direction of rotation of the electric motor, gears can be both disengaged and shifted, and new shifting positions can also be selected. In particular the exemplary embodiment shows in particular a single motor transmission actuator for a compact shift rail arrangement. In the design with a single motor transmission actuator, in particular an active interlock is provided or realized. Hence a transmission actuator is created—in particular according to the exemplary embodiment—which is based on the basic principle of a single motor with active interlock. In addition, the possibility exists, at least according to the exemplary embodiment, of setting a selecting position in which all of the gears are shifted into "neutral" in a single action.

Reference Labels

1 operating device
2 motor vehicle transmission actuator
10 final output mechanism, or mechanism
12 shift rail of 10
12a shift rail of 10
12b shift rail of 10
12c shift rail of 10
12d shift rail of 10
14 shift gap in 12
16 threaded spindle of 2
18 first thread section (right-hand thread)
20 second thread section (left-hand thread)
22a first nut or spindle nut or threaded nut (first main operating part)
22b third nut or spindle nut or threaded nut (second main operating part)
24a second nut or spindle nut or threaded nut (first auxiliary operating part)
24b fourth nut or spindle nut or threaded nut (second auxiliary operating part)
26 arrow
28 arrow
30 circumferential latch
32 functional areas of 24a, 24b
32a functional area for disengaging the gears in operation
32b functional area
34 functional area of 22a
34a functional area for engaging the gears in operation
36 functional area of 22b
38 "blank functional area"
50 housing
52 threadless section
54 electric motor
56 motor output shaft
58 first main operating element
60 second main operating element
62a shifting direction (arrow)
62b shifting direction (arrow)
64 selecting direction (arrow)
66 auxiliary operating element on 24a or 24b
66a auxiliary operating element of 24a
66b auxiliary operating element of 24b
68 plane
70 gearing or second antirotation lock
70a gearing or second antirotation lock between 22a and 24a
70b gearing or second antirotation lock between 22b and 24b
72a radially outer tooth on 24a
72b radially outer tooth on 24b
74 slot in 76
76 slotted plate
78 free wheeling mechanism
80 sheet metal spring 78
82 profile of 78
200 single motor transmission actuator
202 electric motor, arrow
204 actuator mechanism, "black box"
206 first output drive
208 second output drive

What is claimed is:

1. A motor vehicle transmission actuator for operating a motor vehicle transmission having various gear wheel sets that form gears, the motor vehicle transmission actuator comprising:
   at least one main operating part with at least one main operating element for producing positioning movements to engage gears in the motor vehicle transmission, the at least one main operating part being movably situated in such a way that the at least one main operating element situated on the at least one main operating part is movable in a selecting direction to select gears and is movable in a shifting direction to engage gears;
   at least one movably situated auxiliary operating part with at least one auxiliary operating element for producing positioning motions to disengage gears in the motor vehicle transmission; and
   exactly one electric motor for driving the main operating element in the shifting direction and for driving the main operating element in the selecting direction and for driving the at least one auxiliary operating part with the at least one auxiliary operating element;
   wherein the at least one main operating part and the at least one main operating element situated on the at least one main operating part are movable relative to the at least one auxiliary operating part and the at least one auxiliary operating element situated on the at least one auxiliary operating part.

2. The motor vehicle transmission actuator as recited in claim 1 wherein the at least one main operating part includes a first main operating part having at least one first main operating element and a second main operating part having at least one second main operating element.

3. The motor vehicle transmission actuator as recited in claim 2 wherein:
   the first main operating part with the first main operating element produces positioning movements to engage gears in the motor vehicle transmission, the first main operating element being situated on the first main operating part, the first main operating part being movably situated to allow the first main operating element to be movable in the selecting direction to select gears and to be movable in the shifting direction to engage a selected gear;
   the second main operating part with the second main operating element produces positioning movements to engage gears in the motor vehicle transmission, the second main operating element being situated on the second main operating part, the second main operating part being movably situated to allow the second main operating element to be movable in the selecting direction to select gears and to be movable in the shifting direction to engage a selected gear; and
   wherein the first main operating part and the at least one first main operating element being movable relative to the second main operating part and the at least one second main operating element.

4. The motor vehicle transmission actuator as recited in claim 1 wherein the at least one auxiliary operating part includes a first auxiliary operating part with at least one first auxiliary operating element and a second auxiliary operating part with at least one second auxiliary operating element.

5. The motor vehicle transmission actuator as recited in claim 1 wherein one or both of the at least one main operating part and the at least one auxiliary operating part comprise a spindle nut, the motor vehicle transmission actuator having a threaded spindle for receiving the spindle nut(s).

6. A motor vehicle transmission actuator as recited in claim 5 wherein the threaded spindle of the motor vehicle transmission actuator has at least one first thread section having a right-hand thread, and at least one second thread section having a left-hand thread.

7. The motor vehicle transmission actuator as recited in claim 6 wherein the motor vehicle transmission actuator has a plurality of spindle nuts, the spindle nuts being received by the threaded spindle.

8. The motor vehicle transmission actuator as recited in claim 7 wherein the plurality of spindle nuts include a first spindle nut, a second spindle nut, a third spindle nut and a fourth spindle nut each being received by the threaded spindle.

9. The motor vehicle transmission actuator as recited in claim 8 wherein the at least one main operating part includes a first main operating part having at least one first main operating element and a second main operating part having at least one second main operating element and the at least one auxiliary operating part includes a first auxiliary operating part with at least one first auxiliary operating element and a second auxiliary operating part with at least one second auxiliary operating element, the first spindle nut being the first main operating part, the second spindle nut being the first auxiliary operating part, the third spindle nut being a second main operating part and the fourth spindle nut being a second auxiliary operating part.

10. The motor vehicle transmission actuator as recited in claim 3 wherein the electric motor drives the first and second main operating elements in the shifting direction, drives the main operating elements in the selecting direction, and drives the first and second auxiliary operating parts with the at least one auxiliary operating element.

11. The motor vehicle transmission actuator as recited in claim 5 wherein the electric motor has a driving connection with the threaded spindle, the threaded spindle being driven by the electric motor.

12. The motor vehicle transmission actuator as recited in claim 11 wherein the threaded spindle is driven rotationally.

13. The motor vehicle transmission actuator as recited in claim 11 wherein the first and second auxiliary operating parts are decouplabled from the threaded spindle interrupting the driving connection between the first and second auxiliary operating parts and the threaded spindle.

14. The motor vehicle transmission actuator as recited in claim 11 wherein the threaded spindle has at least one threadless section in which the at least one auxiliary operating part is movable such that when the at least one auxiliary operating part is in the threadless section, the threaded spindle is rotatable without driving the at least one auxiliary operating part or subjecting the at least one auxiliary operating part to a load.

15. The motor vehicle transmission actuator as recited in claim 1 wherein the at least one auxiliary operating part includes a first auxiliary operating part with at least one first auxiliary operating element and a second auxiliary operating part with at least one second auxiliary operating element, the shape of the first auxiliary operating part being mirror symmetrical to the second auxiliary operating part in reference to a plane lying between the first and the second auxiliary operating parts.

16. The motor vehicle transmission actuator as recited in claim 14 wherein the at least one main operating part includes a first main operating part having at least one first main operating element and a second main operating part having at least one second main operating element, the first main operating part and the second main operating part being motion-coupled or integrated into the transmission actuator so that any motion of the first main operating part moves the second main operating part simultaneously, and mirror-symmetrically, with the first main operating part with respect to a plane lying between the first and the second main operating parts.

17. The motor vehicle transmission actuator as recited in claim 14 wherein the at least one auxiliary operating part includes a first auxiliary operating part with at least one first auxiliary operating element and a second auxiliary operating part with at least one second auxiliary operating element, the first auxiliary operating part and the second auxiliary operating part being motion-coupled or integrated into the transmission actuator so that any motion of the first auxiliary operating part moves the second auxiliary operating part simultaneously, and mirror-symmetrically, with the first auxiliary operating part with respect to a plane lying between the first and the second auxiliary operating parts.

18. The motor vehicle transmission actuator as recited in claim 7 wherein the at least one main operating part includes a first main operating part having at least one first main operating element and a second main operating part having at least one second main operating element and the at least one auxiliary operating part includes a first auxiliary operating part with at least one first auxiliary operating element and a second auxiliary operating part with at least one second auxiliary operating element, the first main operating part and the first auxiliary operating part meshing with a first thread section of the threaded spindle, and the second main operating part and the second auxiliary operating part meshing with a second thread section of the threaded spindle.

19. The motor vehicle transmission actuator as recited in claim 1 wherein the at least one main operating part is axially movable for shifting and rotationally movable for selecting.

20. The motor vehicle transmission actuator as recited in claim 1 wherein the at least one auxiliary operating part is coupled to a housing in a rotationally fixed connection by a releasable first antirotation lock.

21. The motor vehicle transmission as recited in claim 1 wherein the at least one main operating part is coupled to the at least one auxiliary operating part in a rotationally fixed connection and situated to be axially movable with respect to the at least one auxiliary operating part.

22. The motor vehicle transmission actuator as recited in claim 1 wherein the motor transmission vehicle actuator has at least one unilaterally acting free wheeling mechanism having a free wheeling condition and a blocking condition, the free wheeling mechanism being in the free wheeling condition in the selecting direction and the blocking condition in the shifting direction.

23. The motor vehicle transmission actuator as recited in claim 22 wherein the free wheeling mechanism acts on the at least one main operating part or the at least one auxiliary operating part.

24. An operating device for a motor vehicle transmission, the operating device having a motor vehicle transmission actuator as recited in claim 1, the operating device further comprising a plurality of mechanisms for engaging and disengaging gears, each mechanism having at least one meshing zone, the meshing zone permitting the motor vehicle transmission actuator to operate the mechanism.

25. The operating device as recited in claim 24, wherein each mechanism has an axially movable component, the axially moveable component being a shift gap.

26. The operating device as recited in claim 25 wherein the axially movable component is an axially movable shift rail.

27. The operating device as recited in claim 25 wherein one or both of the at least one main operating element and the at least one main operating part has a maximum stroke greater than a maximum stroke of one or both of the at least one auxiliary operating element and the at least one auxiliary operating part in the direction in which the axially moveable component is moveable.

28. A motor vehicle transmission device comprising:
a plurality of wheel sets for forming gears; and
an operating device as recited in claim 24.

29. The motor vehicle transmission device as recited in claim 28 wherein the wheel sets are gear wheel sets.

30. The motor vehicle transmission device as recited in claim 28 wherein one or both of the at least one main operating element and the at least one main operating part has a maximum stroke greater than a maximum stroke of one or both of the at least one auxiliary operating element and the at least one auxiliary operating part in the direction in which an axially moveable component is moveable.

31. The motor vehicle transmission device as recited in claim 28 wherein the motor vehicle transmission device is a double clutch transmission or parallel shift transmission.

32. The motor vehicle transmission device as recited in claim 28 wherein, via the operating device or the motor vehicle transmission actuator, a selecting position can be set which disengages all of the gears of the transmission or of a particular sub-transmission.

33. A motor vehicle power train having a motor vehicle transmission device as recited in claim 28.

* * * * *